US008655315B2

(12) United States Patent
Huang et al.

(10) Patent No.: US 8,655,315 B2
(45) Date of Patent: Feb. 18, 2014

(54) SMS AUTHENTICATION METHOD

(75) Inventors: Chu-Fa Huang, Taipei (TW); Jui-Min Jiang, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 568 days.

(21) Appl. No.: 13/017,202

(22) Filed: Jan. 31, 2011

(65) Prior Publication Data

US 2012/0122497 A1   May 17, 2012

(30) Foreign Application Priority Data

Nov. 12, 2010  (TW) .............................. 99138941 A

(51) Int. Cl.
*H04W 12/06*   (2009.01)

(52) U.S. Cl.
USPC ...... 455/411; 455/456.1; 705/1.1; 705/14.15; 705/14.23; 705/14.26; 705/14.56; 726/2; 726/3; 726/4; 726/5; 726/14; 726/21

(58) Field of Classification Search
USPC .......... 455/411, 456.1; 705/1.1, 14.15, 14.23, 705/14.26, 14.56; 726/2–4, 14, 21
See application file for complete search history.

(56) References Cited

U.S. PATENT DOCUMENTS

| 2001/0000958 | A1* | 5/2001 | Ulrich et al. ................... 340/539 |
| 2003/0008669 | A1* | 1/2003 | Stein et al. ..................... 455/456 |
| 2004/0259565 | A1* | 12/2004 | Lucidarme ..................... 455/453 |
| 2005/0181812 | A1* | 8/2005 | Scheck .......................... 455/507 |
| 2008/0186892 | A1* | 8/2008 | Damnjanovic ................ 370/311 |
| 2008/0274753 | A1* | 11/2008 | Attar et al. .................. 455/456.6 |
| 2009/0274059 | A1* | 11/2009 | Xing et al. ..................... 370/252 |
| 2010/0048217 | A1* | 2/2010 | Deshpande et al. .......... 455/446 |
| 2010/0081451 | A1* | 4/2010 | Mueck et al. ............... 455/456.1 |
| 2012/0184206 | A1* | 7/2012 | Kim et al. ......................... 455/9 |
| 2012/0322501 | A1* | 12/2012 | Abouzid et al. ........... 455/552.1 |

* cited by examiner

*Primary Examiner* — Lester Kincaid
*Assistant Examiner* — Diego Herrera
(74) *Attorney, Agent, or Firm* — Edwards Wildman Palmer LLP; Peter F. Corless; Steven M. Jensen

(57) ABSTRACT

The present invention provides a SMS authentication method. The SMS authentication method includes transferring the authentication message into different types of authentication codes and/or review codes, sending the authentication codes and/or review codes to the authentication request end and the user via different types, providing the authentication codes input by the user and the authentication codes from the authentication service supply end to the authentication service supply end by the authentication request end, and making the user determine according to the review codes whether the authentication procedure is correct. Hence, the SMS authentication method of the present invention prevents the authentication information from being illegally recorded or stole during the transmission of the authentication message and prevents the phone number from being stole or forged.

14 Claims, 4 Drawing Sheets

SMS AUTHENTICATION METHOD

CROSS-REFERENCES TO RELATED APPLICATIONS

This application claims under 35 U.S.C. §119(a) the benefit of Taiwanese Application No. 099138941, filed Nov. 12, 2010, the entire contents of which is incorporated herein by reference.

BACKGROUND OF THE INVENTION

1. Field of the Invention

The present invention relates to an information authentication method, and more particularly, to an SMS authentication method.

2. Description of Related Art

As internet and on-line information devices are more and more popular, there are various services via internet. Users can access various information services from internet via a personal computer, a laptop, a mobile phone, and etc. For example, users may download software from internet via a computer, play a multimedia file on-line and have sales, shopping, account transfer or stock trades on-line.

It is very convenient and efficient to access services from internet, but the information of users may be illegally accessed, copied, disrupted, changed and even stole. Further, the computer and on-line information devices may be attacked by viruses or other malicious programs. Similarly, the internet service supplier, such as ISP, ICP, portal site and on-line trading site, may be illegally attacked and thus suffer unexpected damages.

In order to prevent the above-mentioned damages, most on-line service suppliers ask user to proceed with an authentication procedure while using or downloading the supplied services, wherein a registered account and password are widely used for such authentication.

However, the account and password may be stolen or cracked. Therefore, some service suppliers provide authentication mechanisms to assist or replace the authentication of account and password. The authentication mechanisms include one-time password, an SMS (short message service) authentication, email reply authentication and etc.

FIG. 1 is a flow chart showing an SMS authentication method in the prior art. In step S101, a user enters an on-line service supply website which needs an SMS authentication. In step S102, the on-line service supply website sends out a request of an SMS authentication to an SMS authentication service system. In step S103, the SMS authentication service system sends out a short message including authentication information via a telecommunication company. In step S104, after the user receives the short message, the authentication information in the short message is input to the on-line service supply website, wherein the authentication information may be a single or multiple words and/or symbols. In step S105, the input authentication information received by the on-line service supply website is sent to the SMS authentication service system, and the SMS authentication service system determines whether the authentication information is correct. In step S106, the SMS authentication service system sends the authentication information, which is determined to be correct or not, back to the on-line service supply website, and then the on-line service supply service website accordingly determines whether the user is authorized to use the supplied on-line services. In the prior art, the authentication information in the short message may be maliciously recorded and stolen.

FIG. 2 is a flow chart showing anther SMS authentication method in the prior art. In step S201, a user enters an on-line service supply website which needs an SMS authentication. In step S202, the on-line service supply website sends out a request of an SMS authentication to an SMS authentication service system. In step S203, the SMS authentication service system provides authentication information to the on-line service supply website via application program interface (API). In step S204, the on-line service supply website provides the authentication message to the user. In step S205, the user sends the short message including the authentication information to a telecommunication company via a specified phone number. In step S206, the telecommunication company sends the received authentication message to the SMS authentication service system. In the S207, the SMS authentication service system determines whether the authentication message sent from the telecommunication company conform to the authentication message sent to the user from the on-line service supply website, and send the determination result to the on-line service supply website. In step S208, the on-line service supply website determines whether the user is authorized to use the supplied on-line services according to the determination result from the SMS authentication service system. The disadvantage of such conventional technology is that if the phone number is stolen or forged, it is difficult to judge whether the user is a real user.

Accordingly, there is a need to develop an SMS authentication method for overcome the drawbacks in the prior art.

SUMMARY OF THE INVENTION

The present invention provides an SMS authentication method for a configuration at least including an authentication request end, an authentication service supply end, a telecommunication service end and an information processing device, comprising the steps of: sending, by the authentication request end, a user information and an authentication request to the authentication service supply end when a service request is sent by a user to the authentication request end via the information processing device; calculating an authentication message according to the user information and transferring the authentication message into at least two authentication codes when the authentication request sent from the authentication request end is received by the authentication service supply end, wherein the at least two authentication codes comprise at least one internet service authentication code and at least one user authentication code; sending, by the authentication service supply end, the internet service authentication code to the authentication request end; and sending by the authentication service supply end the user authentication code to the telecommunication service end; sending, by the telecommunication service end, the user authentication code to the information processing device; providing the user authentication code sent from the telecommunication service end to the authentication request end via the information processing device; sending, by the authentication request end, the user authentication code provided from the information processing device and the internet service authentication code provided from the authentication service supply end to the authentication service supply end; comparing, by the authentication service supply end, the user authentication code and the internet service authentication code with the user information, to determine whether the user is authenticated, and sending an authentication result to the authentication request end; and determining, by the authentication request end according to the authentication result, whether the user is authorized to use services.

The present invention further provides an SMS authentication method for a configuration at least including an authentication request end, an authentication service supply end, a telecommunication service end and an information processing device, comprising the steps of: sending, by the authentication request end, a user information and an authentication request to the authentication service supply end when a service request is sent by a user to the authentication request end via the information processing device; calculating an authentication message according to the user information and transferring the authentication message into at least two authentication codes and at least one user review code when the authentication request sent from the authentication request end is received by the authentication service supply end, wherein the at least two authentication codes comprise at least one internet service authentication code and at least one user authentication code; sending, by the authentication service supply end, the internet service authentication code to the authentication request end; and sending by the authentication service supply end the user authentication code and the user review code to the telecommunication service end; sending, by the telecommunication service end, the user authentication code and the user review code to the information processing device; providing the user authentication code sent from the telecommunication service end to the authentication request end via the information processing device; sending, by the authentication request end, the user authentication code provided from the information processing device and the internet service authentication code provided from the authentication service supply end to the authentication service supply end; comparing, by the authentication service supply end, the user authentication code and the internet service authentication code with the user information, to determine whether the user is authenticated, and sending an authentication result and the user review code to the authentication request end; and after receiving, by the authentication request end, the authentication result and the user review code provided from the authentication service supply end, providing the user review code for the user via the information processing device to compare the user review code from the telecommunication service end with the user review code from the authentication request end.

In contrast to the prior art, the SMS authentication method of the present invention transfers the authentication message into different types of authentication codes and/or review codes, sends the authentication codes and/or review codes to the authentication request end and the user via different types, provides the authentication codes input by the user and the authentication codes from the authentication service supply end to the authentication service supply end by the authentication request end, and makes the user determine according to the review codes whether the authentication procedure is correct. Hence, the SMS authentication method of the present invention prevents the authentication information from being illegally recorded or stolen during the transmission of the authentication message and prevents the phone number from being stolen or forged.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

Embodiment 1

Figure 3:
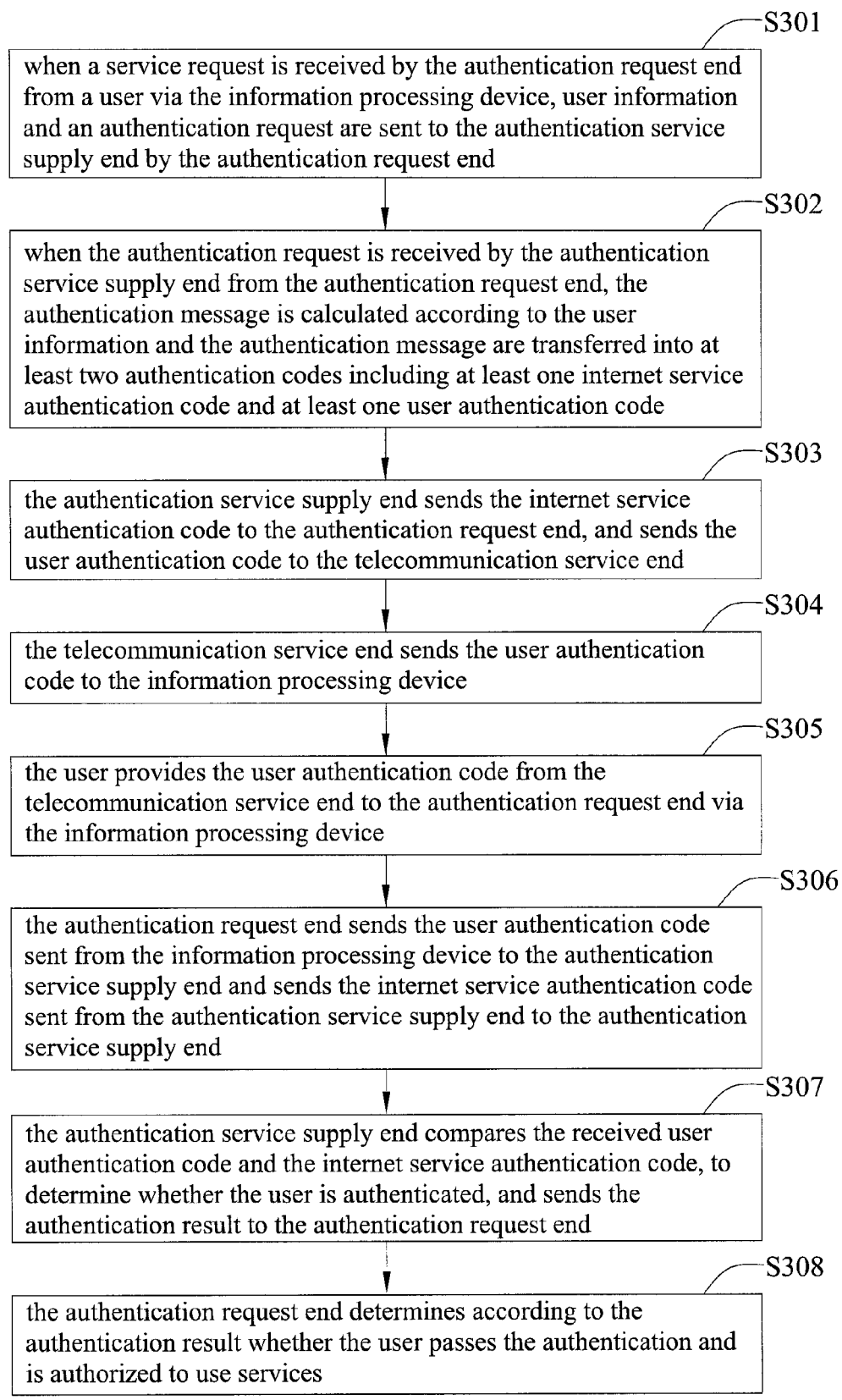
FIG. 3 is a flow chart showing an SMS authentication method according to Embodiment 1 of the present invention.

FIG. 3 is a flow chart showing an SMS authentication method in this embodiment. The SMS authentication method of the present invention is used in a configuration at least including an authentication request end, an authentication service supply end, a telecommunication service end, and an information processing device. The authentication request end, the authentication service supply end, the telecommunication service end and/or the information processing device may be integrated into a single system configuration such as a single internet system, or even integrated into a single server.

The information processing device may be a mobile phone, a laptop, a personal computer which has a device for wireless or wired data transmission and processing. The authentication request end may be a platform of multi-media such as on-line music and/or video for the information processing device or a platform for providing software download, on-line games, on-line sale or shopping or on-line back service. The authentication service supply end may be one or more authentication service platforms as the authentication request end. The telecommunication service end may be used for providing transmission service of the authentication short message, such as the transmission service of the authentication short message provided by a telecommunication company or an internet telecommunication company. The transmission service of the authentication short message may send an authentication message in response to the type of the information processing device. For example, if the information processing device is a mobile phone, the authentication message may be sent via a short message, a voice mail or a voice transmission. If the information processing device is a computer or a mobile having on-line service, the authentication message may be sent via an e-mail.

Figure 1:
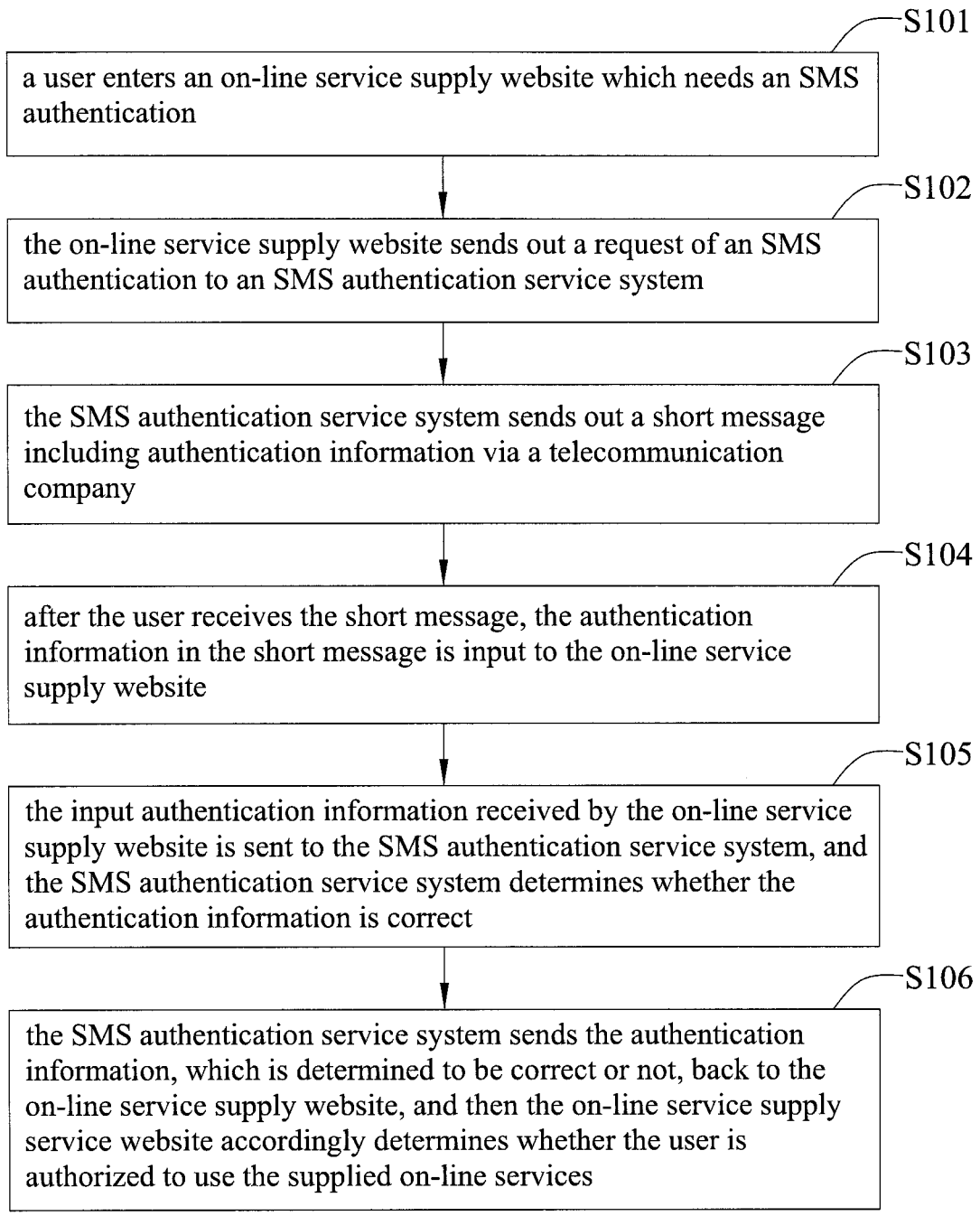
FIG. 1 is a flow chart showing an SMS authentication method in the prior art.
Figure 2:
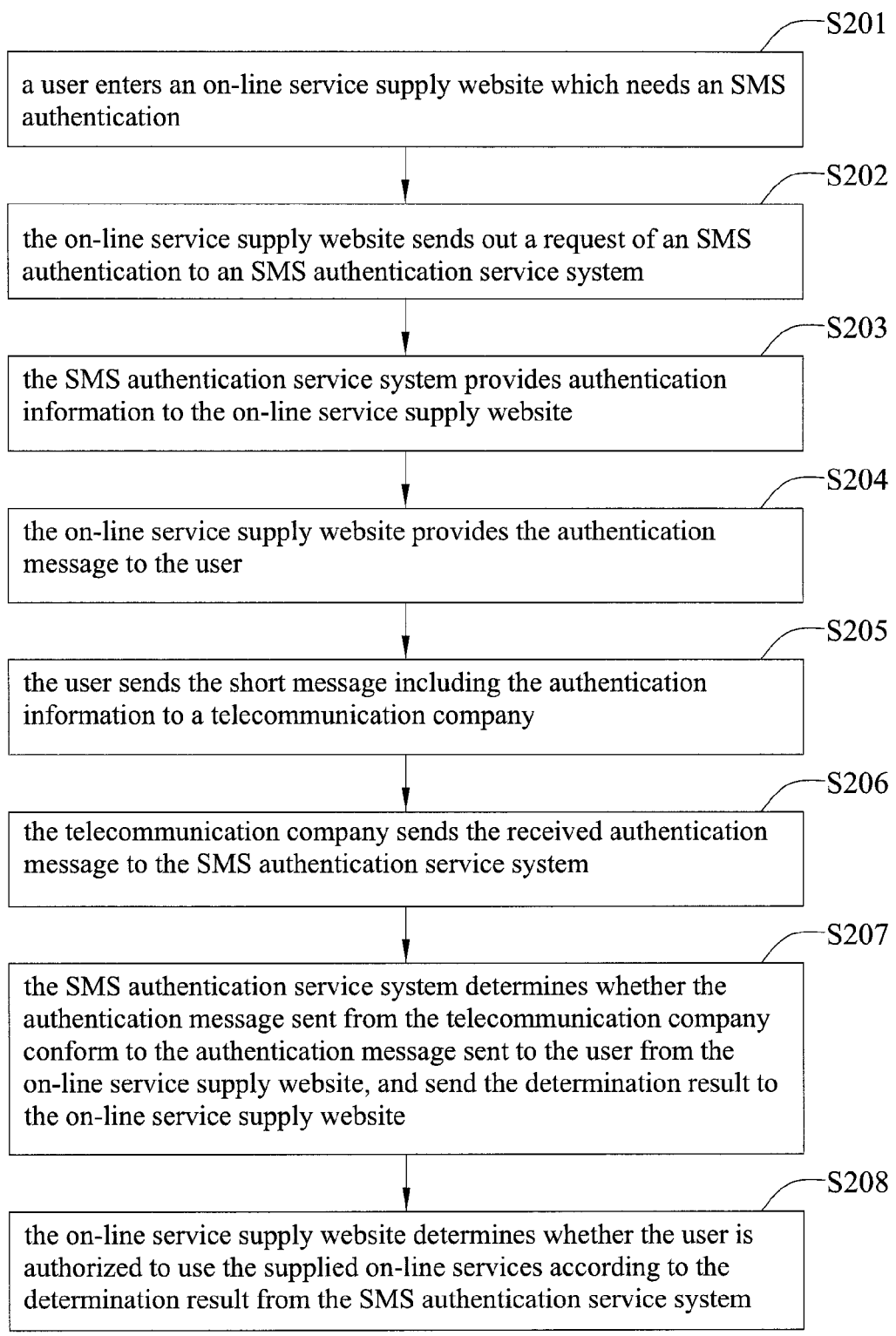
FIG. 2 is a flow chart showing another SMS authentication method in the prior art.

As shown in FIG. 1, in step S301, when a service request is received by the authentication request end from a user via the information processing device, user information and an authentication request are sent to the authentication service supply end by the authentication request end. The service request may be a request for registering to the authentication request end by a user via an information processing device. The user information may include an account that the user registers in the authentication request end. In addition, the authentication request end may include personal date such as a password, ID, birth date, address, phone number and/or name. In this embodiment, the authentication request end and the authentication service supply end are connected via API for data transmission. Other proper data transmissions may be used. Proceed to step S302.

In step S302, when the authentication request is received by the authentication service supply end from the authentication request end, the authentication message is calculated according to the user information and the authentication message are transferred into at least two authentication codes including at least one internet service authentication code and at least one user authentication code. Particularly, every time the internet service authentication code establishes an authentication request session between the authentication request end and the authentication service supply end, the authentication service supply end produces different internet service authentication codes and/or user authentication codes upon calculation, so as to prevent the original (complete) authentication message from being derived while the user authentication code is illegally recorded or obtained. The internet service authentication code and/or the user authentication code may be processed into various transmission types by the authentication service supply end such as API transmission type for the authentication request end, or short messages, e-mail and/or voice mail transmission type for the telecommunication service end. In this embodiment, a short message is used for transmission. Further, the user authentication code may be further transferred into a plurality portions, and these portions may be respectively transmitted to the telecommunication service end via different transmission type. For example, the user authentication code is transferred into three portions, and the three portions may be sent to the communication service end via a short message, an e-mail, and a voice mail, respectively. Proceed to step S303.

In step S303, the authentication service supply end sends the internet service authentication code to the authentication request end, and sends the user authentication code to the telecommunication service end. In this embodiment, the authentication service supply end sends the internet service authentication code to the authentication request end via API, and sends the user authentication code to the telecommunication service end in the previously mentioned way. Certainly, the user authentication code may be transferred into a plurality of portions, and transfers these portions to the telecommunication service end via the same or different transmission ways, so as to reduce the risk that the authentication information is recorded or stolen. Proceed to step S304.

In step S304, the telecommunication service end sends the user authentication code to the information processing device Similarly, the telecommunication service end sends the user authentication code to the information processing device according to the previous transmission type, i.e. a short message or an e-mail. In addition, the telecommunication service end may send the user authentication code to the information processing device via the transmission type different from the previous transmission types. For example, if the authentication service supply end sends the user authentication code to the telecommunication service end via a short message, the telecommunication service end may send the user authentication code to the information processing device via an e-mail and/or a voice mail. Similarly, in one embodiment, the user authentication code and/or the user review code are transferred into a plurality of portions, these portions may be sent to the information processing device via the same or different transmission types. Proceed to step S305.

In step S305, the user provides the user authentication code from the telecommunication service end to the authentication request end via the information processing device. Proceed to step S306.

In step S306, the authentication request end sends the user authentication code sent from the information processing device to the authentication service supply end and sends the internet service authentication code sent from the authentication service supply end to the authentication service supply end. Proceed to step S307.

In step S307, the authentication service supply end compares the received user authentication code and the internet service authentication code, to determine whether these codes match with the user information, which is transferred into the user authentication code and the internet service authentication code, thus to determine whether the user is authenticated, and sends the authentication result to the authentication request end. In addition, in this embodiment, the authentication service supply end determines whether the user is authenticated, i.e. passing the authentication, according to a pre-determined expiration date of user authentication code and/or internet service authentication code, and/or the reuse status of the user authentication code and/or internet service authentication code. For example, if the code is reused, the authentication is failed. Proceed to step S308.

In step S308, the authentication request end determines according to the authentication result whether the user passes the authentication and is authorized to use services.

Embodiment 2

Figure 4:
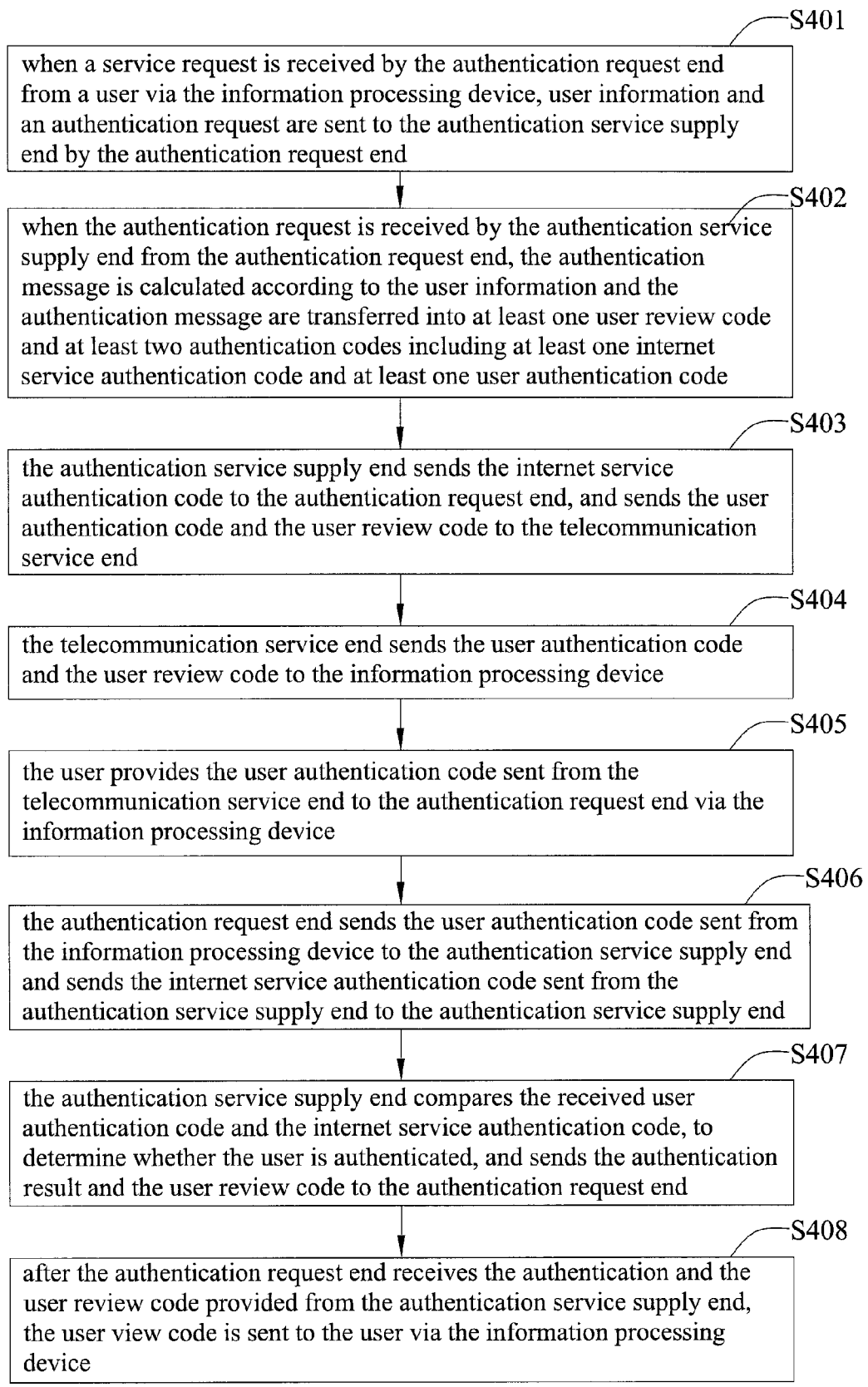
FIG. 4 is a flow chart showing an SMS authentication method according to Embodiment 2 of the present invention.

FIG. 4 is a flow chart showing the SMS authentication method of this embodiment. The configuration and steps in this embodiment are similar to those in Embodiment 1 if there is no special illustration.

As shown in FIG. 4, in step S401, when a service request is received by the authentication request end from a user via the information processing device, user information and an authentication request are sent to the authentication service supply end by the authentication request end. Proceed to step S402.

In step S402, when the authentication request is received by the authentication service supply end from the authentication request end, the authentication message is calculated according to the user information and the authentication message are transferred into at least one user review code and at least two authentication codes including at least one internet service authentication code and at least one user authentication code. Particularly, every time the internet service authentication code establishes an authentication request session between the authentication request end and the authentication service supply end, the authentication service supply end produces different internet service authentication codes, user authentication codes and/or user review codes upon calculation. The internet service authentication code, the user authentication code and/or the user review code may be processed into various transmission types by the authentication service supply end such as API transmission type for the authentication request end, or short messages, e-mail and/or voice mail transmission type for the telecommunication service end. In this embodiment, a short message is used for transmission. Further, the user authentication code and/or the user review code may be further transferred into a plurality portions, and these portions may be respectively transmitted to the telecommunication service end via different transmission type. Proceed to step S403.

In step S403, the authentication service supply end sends the internet service authentication code to the authentication request end, and sends the user authentication code and the user review code to the telecommunication service end. In this embodiment, the authentication service supply end sends the internet service authentication code to the authentication request end via API, and sends the user authentication code and the user review code to the telecommunication service end in the previously mentioned way. Certainly, the user authentication code and/or the user review code may be transferred into a plurality of portions, and transfers these portions to the telecommunication service end via the same or different transmission ways, so as to reduce the risk that the authentication information is recorded or stole. Proceed to step S404.

In step S404, the telecommunication service end sends the user authentication code and the user review code to the information processing device. Similarly, the telecommunication service end sends the user authentication code and the user review code to the information processing device according to the previous transmission type, i.e. a short message or an e-mail. In addition, the telecommunication service end may send the user authentication code and the user review code to the information processing device via the transmission type different from the previous transmission types. Similarly, in one embodiment, the user authentication code and/or the user review code are transferred into a plurality of portions, these portions may be sent to the information processing device via the same or different transmission types. Proceed to the step S405.

In step S405, the user provides the user authentication code sent from the telecommunication service end to the authentication request end via the information processing device. Proceed to step S406.

In step S406, the authentication request end sends the user authentication code sent from the information processing device to the authentication service supply end and sends the internet service authentication code sent from the authentication service supply end to the authentication service supply end. Proceed to step S407.

In step S307, the authentication service supply end compares the received user authentication code and the internet service authentication code, to determine whether these codes match with the user information, which is transferred into the user authentication code and the internet service authentication code, thus to determine whether the user is authenticated, and sends the authentication result and the user review code to the authentication request end. The user review code is provided to the authentication request end after the completion of the authentication, such that if there is error or abnormal status in the preceding authentication procedure, the authentication service supply end would not provide the user review code to the authentication request end. This is to further prevent or reduce the risk that the authentication information is illegally recorded or stole. Optionally, the user review code may be sent together with the authentication result to the authentication request end while passing the authentication. In addition, in this embodiment, the authentication service supply end may determine whether the user is authenticated, i.e. passing the authentication, according to a pre-determined expiration date of user authentication code and/or internet service authentication code, and/or the reuse status of the user authentication code and/or internet service authentication code. For example, if the code is reused, the authentication is failed. Proceed to step S408.

In step S408, after the authentication request end receives the authentication and the user review code provided from the authentication service supply end, the user view code is sent to the user via the information processing device. Then, the user compares the user review code sent from the telecommunication service end with the user review code sent from the authentication request end, so as to determine whether the previous authentication procedure is correct, and decide whether or not to complete the user registration procedure.

In light the above two embodiments, the SMS authentication method of the present invention transfers the authentication message into different types of authentication codes and/or review codes, sends the authentication codes and/or review codes to the authentication request end and the user via different types, provides the authentication codes input by the user and the authentication codes from the authentication service supply end to the authentication service supply end by the authentication request end, and makes the user determine according to the review codes whether the authentication procedure is correct. Hence, the SMS authentication method of the present invention prevents the authentication information from being illegally recorded or stolen during the transmission of the authentication message and prevents the phone number from being stole or forged.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. An SMS authentication method for a configuration at least including an authentication request end, an authentication service supply end, a telecommunication service end and an information processing device, comprising the steps of:
   (1) sending, by the authentication request end, a user information and an authentication request to the authentication service supply end when a service request is sent by a user to the authentication request end via the information processing device;
   (2) calculating an authentication message according to the user information and transferring the authentication message into at least two authentication codes when the authentication request sent from the authentication request end is received by the authentication service supply end, wherein the at least two authentication codes comprise at least one internet service authentication code and at least one user authentication code;
   (3) sending, by the authentication service supply end, the internet service authentication code to the authentication request end, and sending by the authentication service supply end the user authentication code to the telecommunication service end;
   (4) sending, by the telecommunication service end, the user authentication code to the information processing device;
   (5) providing the user authentication code sent from the telecommunication service end to the authentication request end via the information processing device;
   (6) sending, by the authentication request end, the user authentication code provided from the information processing device and the internet service authentication code provided from the authentication service supply end to the authentication service supply end;
   (7) comparing, by the authentication service supply end, the user authentication code and the internet service authentication code with the user information, to determine whether the user is authenticated, and sending an authentication result to the authentication request end; and
   (8) determining, by the authentication request end according to the authentication result, whether the user is authorized to use services.

2. The SMS authentication method of claim 1, wherein in step (2), every time the internet service authentication code establishes an authentication request session between the authentication request end and the authentication service supply end, the authentication service supply end produces different internet service authentication codes, user authentication codes and/or users review codes upon calculation.

3. The SMS authentication method of claim 1, wherein the internet service authentication code and/or the user authentication code are processed as a short message, an e-mail and/or a voice mail by the authentication service supply end.

4. The SMS authentication method of claim 1, wherein in step (4), the telecommunication service end sends the user authentication code to the information processing device according to a transmission type that the user authentication code is sent to the telecommunication service end by the authentication service supply end.

5. The SMS authentication method of claim 1, wherein in step (4), the telecommunication service end sends the user authentication code to the information processing device via another transmission type different from a transmission type that the user authentication code is sent to the telecommunication service end by the authentication service supply end.

6. The SMS authentication method of claim 1, wherein in step (7), the authentication service supply end determines whether the user is authenticated according to a pre-determined expiration date of the user authentication code and/or the internet service authentication code, and/or a repeated usage status of the user authentication code and/or the internet service authentication code.

7. The SMS authentication method of claim 1, wherein in the step (3), the authentication service supply end transfers the user authentication code into a plurality of portions, and sends each of the portions to the telecommunication service end via the same or different transmission types.

8. An SMS authentication method for a configuration at least including an authentication request end, an authentication service supply end, a telecommunication service end and an information processing device, comprising the steps of:
  (1) sending, by the authentication request end, a user information and an authentication request to the authentication service supply end when a service request is sent by a user to the authentication request end via the information processing device;
  (2) calculating an authentication message according to the user information and transferring the authentication message into at least two authentication codes and at least one user review code when the authentication request sent from the authentication request end is received by the authentication service supply end, wherein the at least two authentication codes comprise at least one internet service authentication code and at least one user authentication code;
  (3) sending, by the authentication service supply end, the internet service authentication code to the authentication request end, and sending by the authentication service supply end the user authentication code and the user review code to the telecommunication service end;
  (4) sending, by the telecommunication service end, the user authentication code and the user review code to the information processing device;
  (5) providing the user authentication code sent from the telecommunication service end to the authentication request end via the information processing device;
  (6) sending, by the authentication request end, the user authentication code provided from the information processing device and the internet service authentication code provided from the authentication service supply end to the authentication service supply end;
  (7) comparing, by the authentication service supply end, the user authentication code and the internet service authentication code with the user information, to determine whether the user is authenticated, and sending an authentication result and the user review code to the authentication request end; and
  (8) after receiving, by the authentication request end, the authentication result and the user review code provided from the authentication service supply end, providing the user review code for the user via the information processing device to compare the user review code from the telecommunication service end with the user review code from the authentication request end.

9. The SMS authentication method of claim 8, wherein in step (2), every time the internet service authentication code establishes an authentication request between the authentication request end and the authentication service supply end, the authentication service supply end produces different internet service authentication codes, user authentication codes and/or users review codes upon calculation.

10. The SMS authentication method of claim 8, wherein the internet service authentication code, the user authentication code and/or the user review code are processed as a short message, an e-mail and/or a voice mail by the authentication service supply end.

11. The SMS authentication method of claim 8, wherein in step (4), the telecommunication service end sends the user authentication code and/or the user review code to the information processing device according to a transmission type that the user authentication code and/or the user review code is sent to the telecommunication service end by the authentication service supply end.

12. The SMS authentication method of claim 8, wherein in step (4), the telecommunication service end sends the user authentication code and/or the user review code to the information processing device via another transmission type different from a transmission type that the user authentication code and/or the user review code is sent to the telecommunication service end by the authentication service supply end.

13. The SMS authentication method of claim 8, wherein in step (7), the authentication service supply end determines whether the user is authenticated according to a pre-determined expiration date of the user authentication code and/or the internet service authentication code, and/or a repeated usage status of the user authentication code and/or the internet service authentication code.

14. The SMS authentication method of claim 8, wherein in step (3), the authentication service supply end transfers the user authentication code and/or the user review code into a plurality of portions, and sends each of the portions to the telecommunication service end via the same or different transmission types.

* * * * *